March 17, 1970     S. ELAZAR     3,500,674
STRAIN GAGE TRANSDUCER CIRCUIT
Filed Jan. 11, 1968     2 Sheets-Sheet 1
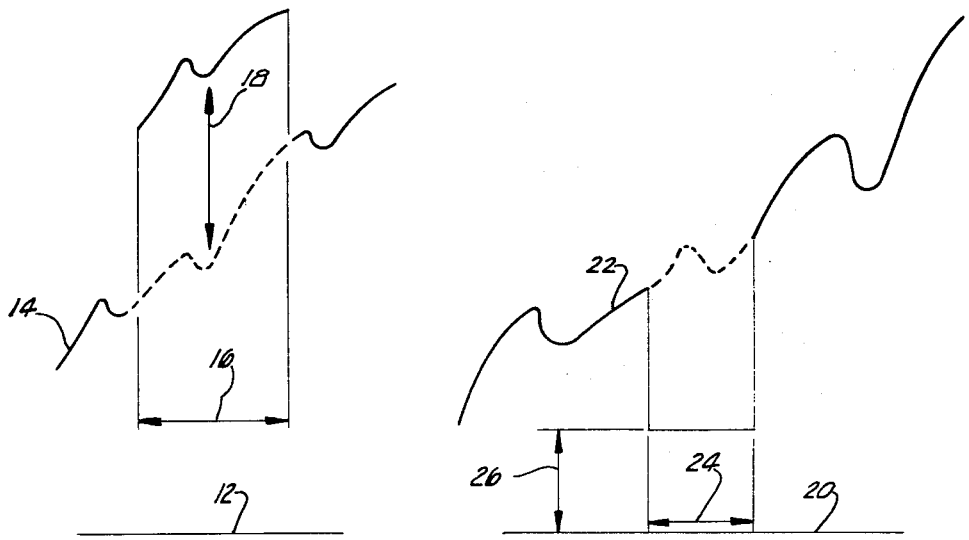
FIG_1_     FIG_4_
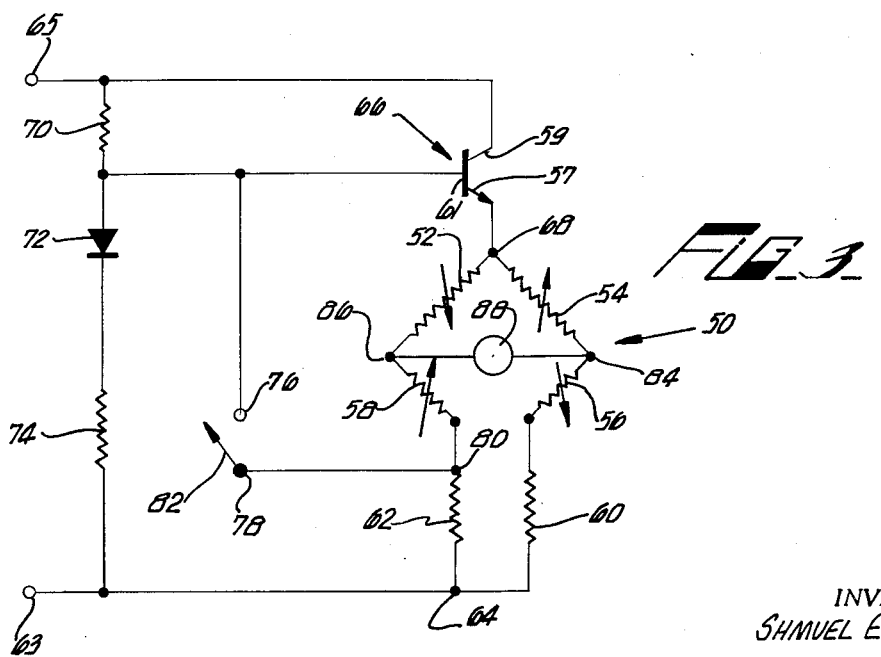
FIG_3_
INVENTOR.
SHMUEL ELAZAR
BY
Christie, Parker & Hale
ATTORNEYS March 17, 1970     S. ELAZAR     3,500,674
STRAIN GAGE TRANSDUCER CIRCUIT
Filed Jan. 11, 1968     2 Sheets-Sheet 2
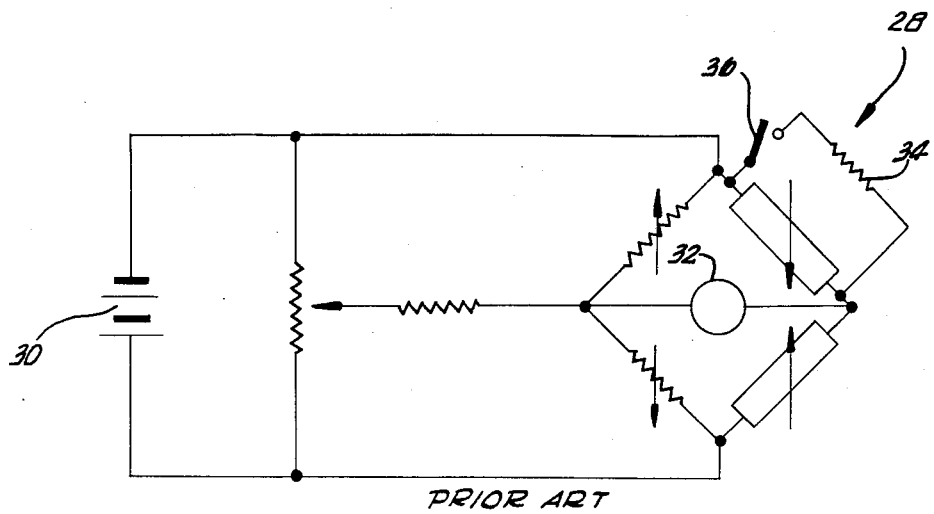
FIG_2A_
PRIOR ART
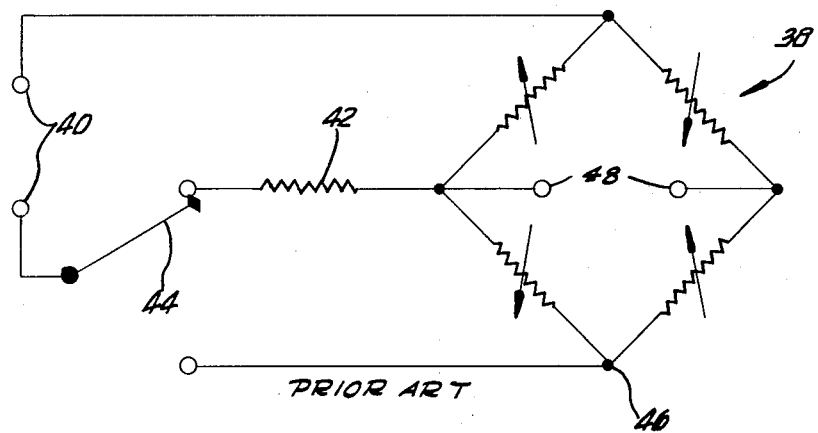
FIG_2B_
PRIOR ART
INVENTOR.
SHMUEL ELAZAR
BY
Christie, Parker & Hale
ATTORNEYS //www.google.com/patents

United States Patent Office 3,500,674
Patented Mar. 17, 1970

---

3,500,674
STRAIN GAGE TRANSDUCER CIRCUIT
Shmuel Elazar, Camarillo, Calif., assignor, by mesne assignments, to Bell & Howell Company, Chicago, Ill., a corporation of Illinois
Filed Jan. 11, 1968, Ser. No. 697,060
Int. Cl. G01c 25/00
U.S. Cl. 73—1                                          7 Claims

ABSTRACT OF THE DISCLOSURE

A transducer circuit including additional elements for calibration of the transducer. Calibration is accomplished by a method referred to as a "series method of calibration." The circuit includes a calibration device connected in series with a strain sensitive bridge network of the transducer. The circuit is provided with a pair of calibration points which when open result in the transducer working in its normal mode with current bypassing the calibration device. When the calibration points are closed or shorted, current then flows through the device so that the voltage which appears at the output of the bridge is due to current flowing through the calibration device and is independent of any physical force being exerted on the transducer.

BACKGROUND OF THE INVENTION

This invention relates to an instrument transducer and in particular to a transducer bridge circuit embodying a series connectable calibration device.

Test instruments such as strain gage devices operating on a Wheatstone bridge circuit principle require calibration for both static and dynamic conditions. Calibration may be defined broadly as the checking, marking or adjusting of a recording device so that the readings of the instrument can be referred to an acceptable standard. Static conditions generally relate to variations which are not dependent upon a rate of change of signals whereas dynamic conditions are functions of changes of time.

In general there are two ways in which a transducer is calibrated. In the first the transducer is subjected to a known amount of actual physical force causing the transducer to generate an output in response to application of the force and the instrument calibrated by virtue of knowing the amount of force exerted.

In many instances, however, it is impracticable or not feasible to apply actual force to the transducer for the reason that the transducer may already be in a testing system and actual forces to be measured by the system may or may not already be applied to the transducer. In such instances the overall sensitivity of the system in which the transducer is connected frequently changes. This can be due to any of several factors, e.g., variation in bridge energizing voltage or amplifier gain, changing line voltage, variations in temperature, etc. In such situations it is highly desirable to be able to cause the transducer bridge to produce an output which will correspond to the output voltage which would result from a predetermined change in resistance of one of the bridge arms. Knowing the deflection produced by a known change of resistance (the calibration device) the system is "calibrated," i.e., the output of the transducer can be read directly in terms of strain without having to know or determine the value of the energizing voltage, the gain in the amplifier, the sensitivity of a recorder connected to the output of the transducer, or any other variable. This is simulated calibration.

Two methods of simulated calibration have been developed, the methods being designated the shunt and series methods of calibration. According to these two methods a calibrated impedance device such as a known value of resistance is connected in the circuit with the bridge in a particular manner. In the shunt method the calibrating device is connected in parallel circuit relationship with one of the arms of the Wheatstone bridge. In the series method of calibration the impedance device is connected in series with the bridge.

In the shunt method of calibration, connection of the calibration device in the bridge circuit is accomplished by closing or shorting a pair of contacts and establishing the required parallel circuit relationship between the device and the bridge arm. While the mechanics of accomplishing the calibration according to the shunt method are extremely simple and represent the desired way in which to accomplish calibration, there is a disadvantage inherent in the shunt method in that the output from the transducer, due to actual strains to which the transducer is subjected, is additive on the calibration indication, making it difficult and at times impossible to accurately measure calibration.

In the series method of calibration the effect of actual strains present during calibration is partially eliminated because the effect of actual strains on the bridge tend to cancel each other and the output from the transducer is that due primarily to the calibrated impedance device now connected in the circuit. However, the presently known series methods of calibration are characterized by two disadvantages, one, the strains present during calibration are not completely eliminated. The second is that prior art series methods have required the use of a relay or a single pole, double throw switch to connect the impedance device in series with the transducer bridge. Relays and switches are bulky and unreliable and in addition vibration frequently opens and closes the relay and switch contacts after the calibration test, making erratic spikes on the recording instrument which can easily be misread as momentary pressure variations in the apparatus or environment under test.

In contrast, the present invention provides a series calibratable strain gage transducer circuit comprising an impedance bridge having an input node, a common node and a pair of output nodes and an impedance device in the bridge having an impedance value variable in response to physical phenomenon to which the transducer is sensitive. A source of energizing voltage is connected to the input node and a calibrating impedance device is connected at one side thereof to the voltage source. Means connecting the side of the calibrating impedance device opposite the voltage source to the common node is provided as is selectively operable means for coupling this same side of the calibrating device to a point on the bridge intermediate one of said output nodes and said common node. Switching means are connected between the voltage source and the input node of the impedance bridge such that the switching means is in parallel circuit relationship with the calibrating impedance device whereby operation of the coupling means causes electrical current from the source to flow through the calibrating impedance device and at least a portion of the bridge while preventing the flow of current through the switching means to provide a series simulated calibration of the transducer circuit.

The present invention improves the series method of calibration in that the effect of actual strains present during calibration now has no effect on the output during simulated calibration. At the same time it incorporates the shunt method of connecting a calibration device into the circuit of the transducer since the connection is now accomplished by the expedient of shorting or closing a pair of calibration terminals.

These and other advantages will be better understood by reference to the detailed description and drawings which follow.

BRIEF DESCRIPTION OF THE FIGURES

FIG. 1 is a graph illustrating transducer operation utilizing the shunt method of calibration;

FIG. 2A is a schematic diagram illustrating a prior art shunt calibrated transducer circuit;

FIG. 2B is a schematic diagram illustrating a prior art series calibrated transducer circuit;

FIG. 3 is a schematic diagram illustrating the modified series method of calibration according to the present invention; and FIG. 4 is a graph illustrating transducer operation utilizing the series method of calibration of FIG. 3.

As indicated previously, there are two widely used methods by which an instrument transducer can be subjected to a simulated calibration, i.e., a calibration which is accomplished by substituting an electronic measurement for actual exertion of a measurable physical force on a transducer. Graphs illustrating transducer output obtained by these two methods of calibration are provided in FIGS. 1 and 4. In FIG. 1 the shunt method of calibration is graphed. Shown on the graph is a zero or reference line 12 and a transducer output trace 14. During a portion of the operation shown in FIG. 1 the output trace during a time period 16 reflects the interval during which the transducer is subjected to shunt calibration. During this interval the transducer output steps up a distance 18, the calibration distance, which is additive to the output due to actual strains exerted on the transducer.

In FIG. 4 the output resulting from the series method of calibration is graphed and again the pertinent portions of the graph are a zero or reference line 20 and a transducer output trace 22 interrupted by a calibration period 24. In the series method of calibration the effect of actual strains exerted on the transducer is substantially reduced and the calibration distance 26 is the distance measured from the reference line to the calibration output.

Electrical schematic diagrams in FIGS. 2A and 2B illustrate the electrical circuit relationships of typical strain gage transducer circuits operating on the bridge principle including circuitry for calibrating the transducer according to the shunt and series method of calibration. In FIG. 2A bridge 28 is connected to a source of energizing voltage 30. The bridge comprises four arms connected in the familiar Wheatstone bridge circuit relationship, each of the arms being comprised of an impedance utilizing strain sensitive wire. The arms of the bridge are arranged such that when a force is exerted on the transducer, one pair of arms experiences a decrease in resistance and the other pair of arms, an increase in resistance. In an unstrained or balanced condition the output voltage from the bridge as read by a meter 32 across a pair of output nodes opposite the pair of input nodes connected to the source of energizing voltage is zero. When a force is exerted on the transducer the change in resistance in the arms of the bridge results in a difference of potential across the output nodes which is proportional to the amount of force exerted on the transducer.

To artificially achieve the same result as if actual strains were exerted on the bridge, a resistor 34 is connected in parallel circuit (shunt) relationship with one of the arms of the bridge by means of a switch 36. Resistor 34 is a calibrating impedance device which when connected in the circuit of the bridge produces a known output on meter 32. By connecting resistor 34 in the circuit by means of switch 36, the transducer can be calibrated at any time desired, normally immediately prior to test, to get up-to-date calibration information regarding the transducer.

The series method of calibration is illustrated in FIG. 2B and provides a bridge 38 comprised of strain sensitive arms arranged to be connected to a source of energizing voltage (not shown) at terminals 40. Connected to one of the output nodes of the bridge opposite the nodes normally connected to the source of energizing voltage is a calibrating impedance device 42. A single pole, double throw switch 44 is connected to one of the input terminals 40 and is alternately connectable to impedance device 42 and input node 46 of the bridge. In normal operation of the transducer, switch 44 is connected to node 46 and the output at terminals 48 is proportional to the force exerted on the transducer. When calibration of the transducer is desired, switch 44 is operated and calibrating impedance device 42 connected into the circuit. The output at terminals 48 is then the calibrated output from the transducer.

A disadvantage of the shunt method of calibration is that the output due to actual strains is additive to the calibration output, making it difficult to accurately measure calibration alone. For example, if the shunt calibration is chosen so as to produce a simulated output which is 50% of full range, e.g., 2.5 volts in a high output transducer and if the input pressure happens to be 100% of full range (5 volts), the total output from the transducer should be 7.5 volts. However, most high output transducers are limited to 5.5 volts at the upper limit which makes the measurement of the calibration voltages meaningless.

In the second of the two prior art methods, series calibration, the effect of actual strains present during calibration is only substantially reduced, and not completely eliminated. The contribution due to actual strains during series calibration is a matter for mathematical calculation for each type of transducer, but in at least one instance it amounts to approximately a 1% of the calibration voltage. In addition, because the series method requires a switch mechanism it can, and frequently has, happened that vibrations from the apparatus under test have been transmitted to the mechanism, causing the switch to momentarily connect the calibration device into the circuit, thereby producing erroneous indications of pressure changes.

To eliminate the disadvantages cataloged above, the present invention, which is illustrated in FIG. 3, is provided. The invention incorporates the advantageous features of both the shunt and prior art series method of calibration in a method which can be designated a modified series method of calibration. As shown in FIG. 3, the strain sensitive arms 52, 54, 56 and 58 are connected in a modified Wheatstone bridge configuration. The term "modified" is used to describe the bridge configuration because strain sensitive arms 56 and 58 do not connect together at common node 64, but rather are connected thereto through impedances 60 and 62, respectively. The common node 64 of the bridge, at the junction between impedances 60 and 62 is connected to common terminal 63, one of the input terminals to the transducer circuit. The other of the transducer terminals, input terminal 65, is connected through a transistor 66 to input node 68 of bridge 50. The connection is made through the emitter 57-collector 59 circuit of transistor 66. The base 61 of the transistor is connected to the junction between impedance device 70 and diode 72. A calibrating impedance device 70 is connected from input terminal 65 through a diode 72 and biasing resistor 74 to common terminal 63. The side of impedance device 70 connected to diode 72 is also connected to one of a pair of calibration terminals 76. The other of the calibration terminals 78 is connected to the junction 80 common to strain sensitive arm 58 and impedance 62. A shorting means 82 such as a switch is provided for "shorting" or closing the calibration terminals when it is desired to calibrate the transducer according to the method of the present invention. When subjected to actual strains the output from the bridge is read across output nodes 84 and 86 by meter 88. Normal operation of the transducer is obtained when shorting device 82 is open and current flows through transistor 66 to node 68 of the bridge. When it is desired to make a simulated calibration of the transducer, shorting device 82 is closed. This prevents current from flowing through transistor 66 and the voltage which appears across the output at nodes 84 and 86 on meter 88 is due to the current flowing through the calibrating impedance device 70.

A mathematical analysis of the effect of actual strains during calibration demonstrates that the effect of actual strains during simulated calibration is zero, i.e., the simulated calbration output does not change at all due to pressure. Thus, the present invention is able to achieve calibration by means of the simple shorting of a pair of terminals as in the shunt method of calibration without the transducer output being affected in any way by actual strains present on it.

Diode 72, a conventional type of diode, performs the function of compensating variations in the base-emitter voltage of transistor 66 due to temperature change to further enhance the accuracy of operation of the circuitry.

In its detailed operation, the closing of switch 82 produces a current flow through calibrating impedance 70 and effectively removes the forward biasing voltage between the base and emitter of transistor 66 thus interrupting current flow from collector to emitter and removing excitation from node 68 of the bridge. At the same time, excitation is applied between nodes 80 and 64 and current flowing into node 80 from calibrating impedance device 70 splits with part of the current flowing through the impedance 62 and the remaining part through the path defined by impedances 58, 52, 54, 56 and 60. The current flowing through this latter path causes a potential drop to appear across nodes 84 and 86. In accordance with conventional strain gage operation, the impedance of bridge arm 52 increases by the same amount as the impedance in bridge arm 54 decreases or vice versa and the impedance of bridge arm 56 has a like relationship to the impedances of bridge arm 58 when pressure on the Wheatstone actuating device (transducer) varies. Under such circumstances the potential drop measured across nodes 86 and 84 is dependent upon the current flowing from node 80 to node 64 and independent of any pressure change. The selection of particular values for the various impedances of the calibrating circuitry is dependent upon the impedance values involved in the bridge arms of the transducer.

What is claimed is:

1. A series calibratable, strain gage transducer circuit comprising:
    an impedance bridge having an input node, a common node and a pair of output nodes;
    an impedance device in the bridge having an impedance value variable in response to physical phenomenon to which the transducer is sensitive;
    a source of energizing voltage connected to the input node;
    a calibrating impedance device connected on one side thereof to the voltage source;
    means connecting the side of the calibrating impedance device opposite the voltage source to the common node;
    selectively operable means for coupling the side of the calibrating impedance device opposite the voltage source to a point on the bridge intermediate one of said output nodes and said common node; and
    switching means connected between the voltage source and the input node on the bridge, said switching means being connected in an electrical circuit relation with said calibrating impedance device whereby operation of the coupling means causes electrical current from the source to flow through said calibrating impedance device and at least a portion of said bridge while preventing the flow of current through the switching means to provide a series simulated calibration of the transducer circuit.

2. A transducer circuit according to claim 1 wherein the switching means is a transistor having an emitter, collector and base, the emitter-collector circuit being connected between the voltage source and the input node and the base being connected to the side of a calibrating impedance device opposite the voltage source.

3. A transducer circuit according to claim 2 wherein the impedance bridge comprises four strain sensitive impedance means.

4. A transudcer circuit according to claim 2 including first impedance means connected between the common node and a bridge impedance means connected to one of said output nodes and a second impedance means connected between the common node and a second bridge impedance means connected to the second of the pair of output nodes.

5. A transducer circuit according to claim 4 wherein the means connecting the side of the calibrating impedance device opposite the voltage source to the common node includes a one-way current device.

6. A transducer circuit according to claim 5 wherein said selectively operable coupling means includes a pair of shorting terminals, the first of said terminals being connected to the junction between the calibrating impedance device and one-way current means, the second of said terminals being connected to the junction between said first impedance device and the bridge impedance means connected thereto, said shorting terminals further including means for closing the circuit between said terminals.

7. A transducer circuit according to claim 6 including biasing means for the transistor connected between the one-way current device and the common node.

References Cited

UNITED STATES PATENTS

| | | |
|---|---|---|
| 3,439,258 | 4/1969 | Leeuwen. |
| 3,450,978 | 6/1969 | Norman _____ 73—398 X |
| 3,130,578 | 4/1964 | Ames. |
| 3,203,223 | 8/1965 | Petrow. |
| 3,319,155 | 5/1967 | Kooiman. |

S. CLEMENT SWISHER, Primary Examiner

U.S. Cl. X.R.

323—75